C. L. MICHOD.
SECURING MEANS.
APPLICATION FILED MAY 16, 1918.
1,279,397.
Patented Sept. 17, 1918.
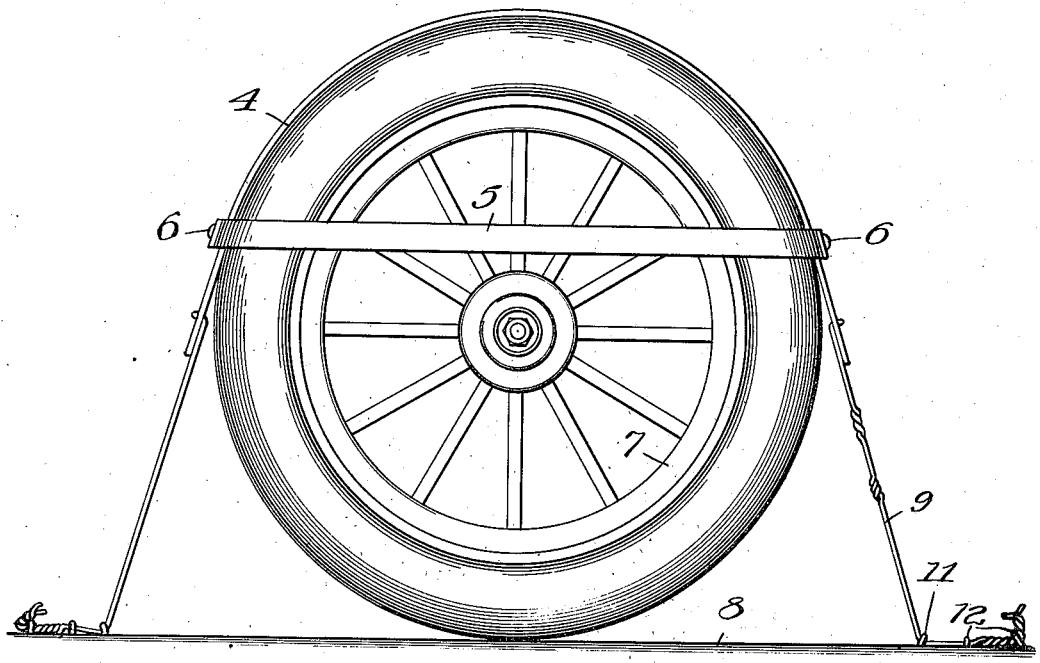
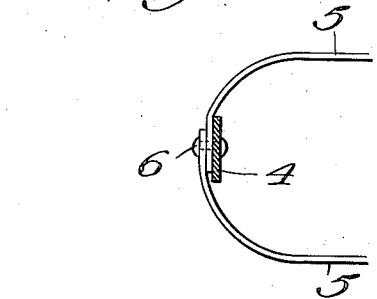
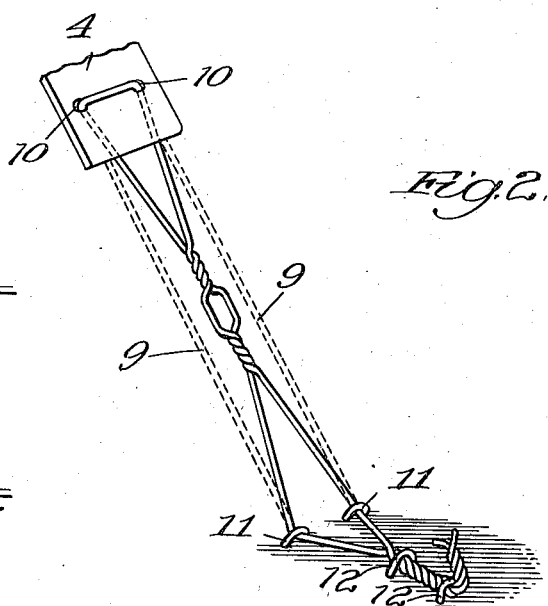
Inventor:
Charles L. Michod,

# UNITED STATES PATENT OFFICE.

CHARLES L. MICHOD, OF CHICAGO HEIGHTS, ILLINOIS.

SECURING MEANS.

1,279,397.

Specification of Letters Patent. Patented Sept. 17, 1918.

Application filed May 16, 1918. Serial No. 234,917.

*To all whom it may concern:*

Be it known that I, CHARLES L. MICHOD, a citizen of the United States, residing at Chicago Heights, in the county of Cook and State of Illinois, have invented a new and useful Improvement in Securing Means, of which the following is a specification.

My invention relates, more particularly, to means for securing automobiles, or other heavy vehicles, to the floor of freight cars on which they are transported, in order that they be maintained in a certain fixed position on the car floor regardless of the sudden stopping or starting of the car; and my object is to provide a novel, simple, and inexpensive construction of means for this purpose, which may be readily applied to use and by which the strain on the vehicle secured thereby, is reduced to the minimum.

Referring to the accompanying drawing:

Figure 1 is a view in side elevation of one wheel of a vehicle, as for example an automobile, shown as resting on the floor of a car, represented by a single line to designate the upper plane of the floor, this view showing my improved securing means in position for coöperation with the wheel illustrated, the securing wires at one end only of the securing means being twisted into taut condition. Fig. 2 is a broken perspective view of the right-hand end of the securing means shown in Fig. 1, the wires being shown by full lines in twisted, securing, position, and by dotted lines in the position they assume before being twisted; and Fig. 3, a plan sectional view taken through the securing means at one end thereof at a point above certain encircling members employed.

In accordance with the preferred embodiment of my invention, the securing means are formed of a strip 4, which may be of any suitable material, as for example metal or fabric, and a side member extending at opposite sides of the strip member 4 at a point considerably below the upper portion of the latter to form a cage-like structure to fit over the top of the wheel to which it is to be applied, the strip member 4 being of arc-shape in side elevation and preferably describing an arc substantially the same radius as the arc presented by the tread-portion of the tire on the wheel, so that when this retaining cage is applied to the upper portion of the wheel, it will conformingly fit the latter. The side member referred to may be constructed in any suitable way, it being preferred that it be of strip form, as represented. This part of the construction, as shown, is made up of two strip-sections 5, one of which extends across one side of the strip 4 and the other of which extends across the opposite side, the strips 5 being united at their overlapped ends to the strip 4, as represented at 6 in the drawing. The structure thus provided would coöperate with means at its ends at opposite portions of the wheel for securing this structure, under tension, to the floor of the car on which the vehicle is to be held down. The floor of a car supporting the pneumatic tire-equipped wheel 7 of a vehicle is indicated diagrammatically at 8 and the particular construction of securing means for the purpose just stated, comprises a wire 9 which extends intermediate its ends through openings 10 in the end of the strip 4, it being understood that one of these wires is connected with each end of the strip 4, these wires being suitably secured at their lower ends, under tension, to the floor 8 of the car, as for example by means of the staples 11 and 12, which are driven into the floor and hold the wires as shown. If desired, and as preferred, the wires 9 are twisted into the condition shown in full lines in Fig. 1 to cause them to be placed under the desired tension for firmly holding the wheel against movement on the floor 8 of the car.

The provision of the side structure, shown as formed of the strips 5, is desirable as it serves to hold the member 4 against lateral displacement on the wheel.

Another advantage resulting from the securing of a vehicle in accordance with my invention, is that in the case of sudden jars exerted in a direction lengthwise of the car, as for example in the sudden starting or stopping of the car, the force of the blow is yieldingly restrained by reason of the fact that the resilient tire is interposed between the wheel and the securing means, and thus danger of breaking of the springs of the vehicle, which often occurs when the vehicle is held down by means engaging a rigid part of the vehicle, is minimized.

It will be understood that in practice, it is preferred that all of the wheels of a vehicle be secured to the floor of the car, as explained of the one wheel shown in the drawing. The wires 9 at one end only of the wheel-engaging structure described, are shown as twisted, though it will be understood that in practice, the wires at both ends would be twisted if conditions rendered it desirable.

While I have illustrated and described a particular embodiment of my invention, I do not wish to be understood as intending to limit it thereto, as the same may be variously modified and altered without departing from the spirit of my invention.

What I claim as new and desire to secure by Letters Patent is—

1. A device for the purpose set forth comprising a curved member adapted to conformingly fit a portion of the circumference of the wheel of a vehicle and side portions operatively connected with said curved member and extending across the opposite faces of the wheel to form therewith a structure adapted to be held down on the wheel under considerable tension and which will not slip laterally off the wheel, said device being adapted for coöperation with means operatively connecting it to the support on which the wheel rests, to place said member under tension as stated.

2. A device for the purpose set forth comprising a curved member adapted to conformingly fit a portion of the circumference of the wheel of a vehicle and side portions operatively connected with said curved member and extending across the opposite faces of the wheel to form therewith a structure adapted to be held down on the wheel under considerable tension and which will not slip laterally off the wheel, and means carried by said member at opposite ends thereof adapting the device to be secured to the support on which the wheel rests, to place said member under tension as stated.

CHARLES L. MICHOD.